US010826927B1

(12) United States Patent
Assareh et al.

(10) Patent No.: US 10,826,927 B1
(45) Date of Patent: Nov. 3, 2020

(54) SYSTEMS AND METHODS FOR DATA EXFILTRATION DETECTION

(71) Applicant: FMR LLC, Boston, MA (US)

(72) Inventors: Amin Assareh, Boston, MA (US);
Charles Voelker, Boston, MA (US);
Peter Theodoros, Boston, MA (US);
Joshua Marine, Boston, MA (US);
Michael Noto, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/809,997

(22) Filed: Mar. 5, 2020

(51) Int. Cl.
*H04L 29/06* (2006.01)
*H04L 12/26* (2006.01)

(52) U.S. Cl.
CPC ........ *H04L 63/1425* (2013.01); *H04L 43/106* (2013.01); *H04L 63/0236* (2013.01); *H04L 63/1416* (2013.01); *H04L 63/1433* (2013.01); *H04L 63/20* (2013.01)

(58) Field of Classification Search
CPC ............. H04L 63/1416; H04L 63/1425; H04L 63/1408; H04L 67/22; G06Q 30/02
USPC ......................................................... 726/22
See application file for complete search history.

(56) References Cited

U.S. PATENT DOCUMENTS

| 8,516,573 B1* | 8/2013 | Brown ................ H04L 63/1416 726/22 |
| 10,045,218 B1 | 8/2018 | Stapleton et al. |
| 2015/0215332 A1* | 7/2015 | Curcic .................... H04L 63/20 726/25 |
| 2019/0087737 A1 | 3/2019 | Pendar et al. |

FOREIGN PATENT DOCUMENTS

| EP | 3451219 A1 | 3/2019 |
| WO | 2019109741 A1 | 6/2019 |

* cited by examiner

*Primary Examiner* — Evans Desrosiers
(74) *Attorney, Agent, or Firm* — Proskauer Rose LLP (57) ABSTRACT

Systems and methods for detecting anomalous data traffic over proxy servers in a data communications network. The method includes receiving, by a server computing device, network log data corresponding to data traffic during a timeframe. The method further includes normalizing the network log data using at least one of timestamp data of the network log data or IP address data of the network log data. The method also includes extracting risk-based data features from the network log data. The method further includes calculating using an isolation forest algorithm, anomaly scores for the normalized network log data based on the extracted risk-based features. The method also includes determining at least one anomaly event based on the calculated anomaly scores. The method further includes identifying at least one host device and at least one timestamp corresponding to the at least one anomaly event.

18 Claims, 11 Drawing Sheets

NETWORK LOG DATA 300

TIMESTAMP DATA
310

IP ADDRESS DATA
320

RISK-BASED DATA FEATURES 330

DESTINATION-BASED
332

TRAFFIC-BASED
334

HOST-BASED
336

TIME-BASED
338

| Log Date | Log Time | IP | Category | Time Taken | Bytes |
|---|---|---|---|---|---|
| 2019-12-01 | 01:15:01 | 10.105.90.105 | "Finance" | 375 | 3125 |
| 2019-12-01 | 01:15:01 | 10.99.200.28 | "Finance" | 432 | 6105 |
| 2019-12-01 | 01:15:02 | 10.105.90.105 | "Technology/Internet" | 1254 | 29856 |
| 2019-12-01 | 01:15:04 | 10.105.90.105 | "Technology/Internet" | 1277 | 32264 |
| 2019-12-01 | 01:15:05 | 10.105.90.105 | "Technology/Internet" | 1308 | 16920 |
| 2019-12-01 | 01:15:06 | 10.105.90.105 | "Technology/Internet" | 1462 | 103876 |
| 2019-12-01 | 01:15:08 | 10.105.90.105 | "Technology/Internet" | 7553 | 6984 |
| 2019-12-01 | 01:15:14 | 10.105.90.105 | "Technology/Internet" | 7317 | 6912 |
| 2019-12-01 | 01:15:15 | 10.87.17.99 | "Finance" | 4027 | 3981 |
| 2019-12-01 | 01:15:21 | 10.87.17.99 | "Finance" | 5566 | 5173 |
| 2019-12-01 | 01:15:40 | 10.132.230.15 | "Business/Economy" | 3682117 | 4787 |
| 2019-12-01 | 01:16:01 | 10.122.85.10 | "Technology/Internet" | 1419 | 93148 |
| 2019-12-01 | 01:16:02 | 10.122.85.10 | "Technology/Internet" | 1242 | 29680 |
| 2019-12-01 | 01:16:03 | 10.122.85.10 | "Technology/Internet" | 1191 | 31784 |

FIG. 5

| IP | Country | City | Company Name | Kind | Zip Code |
|---|---|---|---|---|---|
| 205.219.64.99 | US | Chicago | Savvis | Org | 60290 |
| 23.2.6.169 | US | Cambridge | Akamai Technologies | Org | 2142 |
| 121.244.154.25 | IN | Bangalore | IRT-TATACOMM-IN | Group | 560018 |
| 96.16.97.146 | US | Cambridge | Akamai Technologies | Org | 2142 |
| 23.3.9.88 | US | Dallas | Akamai Technologies | Org | 75201 |
| 74.208.19.93 | US | Kansas City | 1&1 Internet Inc. | Org | 64101 |
| 54.76.244.10 | US | Dublin | Amazon Technologies | Org | D8 |
| 52.207.26.191 | US | Ashburn | Amazon Technologies | Org | 20146 |
| 54.70.168.68 | US | Portland | Amazon Technologies | Org | 97086 |
| 184.86.102.203 | US | Ashburn | Akamai Technologies | Org | 20146 |
| 52.90.253.43 | US | Ashburn | Amazon Technologies | Org | 20146 |
| 54.209.176.85 | US | Ashburn | Amazon.com Inc. | Org | 20146 |
| 54.246.156.22 | US | Dublin | Amazon Technologies | Org | D8 |
| 54.91.75.147 | US | Ashburn | Amazon Technologies | org | 20146 |

FIG. 6

| Log Date | Log Time | DHCP Host | IP | MAC | Domain |
|---|---|---|---|---|---|
| 2018-04-22 | 00:03:25 | AVE0E4A10 | 10.167.38.10 | 00096e0e4d10 | Fidelity.com |
| 2018-04-22 | 00:03:31 | AVE0E4A10 | 10.167.32.10 | 00096e0e4a10 | Fidelity.com |
| 2018-04-22 | 00:16:42 | AVE0E4A10 | 10.167.32.10 | 00096e0e4a10 | Fidelity.com |
| 2018-04-22 | 00:19:19 | AVE0E4A10 | 10.167.32.10 | 00096e0e4a10 | Fidelity.com |
| 2018-04-22 | 00:24:10 | LAP078110 | 10.179.8.10 | 185e0f81421d | Domain.fidelity.com |
| 2018-04-22 | 00:24:41 | LAP078210 | 10.179.8.10 | 185e0f823f10 | Domain.fidelity.com |
| 2018-04-22 | 00:30:46 | LAP155210 | 10.165.232.10 | 554e64fff10 | Fidelity.com |
| 2018-04-22 | 00:30:47 | LAP078110 | 10.179.8.10 | 4c34889fd510 | Domain.fidelity.com |
| 2018-04-22 | 00:48:08 | AVE0E4A10 | 10.167.32.10 | 00096e0e4a10 | Fidelity.com |
| 2018-04-22 | 00:53:21 | AVE0E4A10 | 10.167.32.10 | 00096e0e4a10 | Fidelity.com |
| 2018-04-22 | 00:01:10 | Polycom-10 | 10.84.84.10 | 0004f2c8c6010 | Fidelity.com |
| 2018-04-22 | 00:58:35 | AVE0E4A10 | 10.167.32.10 | 00096e0e4a10 | Fidelity.com |
| 2018-04-22 | 01:00:03 | Jeffs-iPad | 10.179.8.10 | 380f4ab2c810 | Fidelity.com |
| 2018-04-22 | 01:05:58 | iPhone | 10.179.14.10 | bc9fefece710 | Fidelity.com |

FIG. 7

| Employee ID | Display Name | Mailzone | Job Code | Work Relationship |
|---|---|---|---|---|
| E1111111 | SMITH, MARK | HONGKONG | ASSOCIATE DIRECTOR | REGULAR EMPLOYEE |
| E1111111 | SMITH, MARK | HONGKONG | ASSOCIATE DIRECTOR | REGULAR EMPLOYEE |
| E1111111 | SMITH, MARK | HONGKONG | ASSOCIATE DIRECTOR | REGULAR EMPLOYEE |
| E1111111 | SMITH, MARK | HONGKONG | ASSOCIATE DIRECTOR | REGULAR EMPLOYEE |
| E1111111 | SMITH, MARK | HONGKONG | ASSOCIATE DIRECTOR | REGULAR EMPLOYEE |
| E1111111 | SMITH, MARK | HONGKONG | ASSOCIATE DIRECTOR | REGULAR EMPLOYEE |
| E9999999 | DOE, JOHN | SALT LAKE CITY | RETIREMENT REP IV | REGULAR EMPLOYEE |
| E9999999 | DOE, JOHN | SALT LAKE CITY | RETIREMENT REP IV | REGULAR EMPLOYEE |
| E9999999 | DOE, JOHN | SALT LAKE CITY | RETIREMENT REP IV | REGULAR EMPLOYEE |
| E9999999 | DOE, JOHN | SALT LAKE CITY | RETIREMENT REP IV | REGULAR EMPLOYEE |
| E9999999 | DOE, JOHN | SALT LAKE CITY | RETIREMENT REP IV | REGULAR EMPLOYEE |
| E9999999 | DOE, JOHN | SALT LAKE CITY | RETIREMENT REP IV | REGULAR EMPLOYEE |
| E9999999 | DOE, JOHN | SALT LAKE CITY | RETIREMENT REP IV | REGULAR EMPLOYEE |

FIG. 8

| Owned By | Employee ID | CPU Count | Operating System | OS Type | Site Name |
|---|---|---|---|---|---|
| Beach, Sandy | E3000600 | 1 | RHEL 7.x / OEL 7.x | Linux | Datacenter1 |
| Beach, Sandy | E3000600 | 1 | Ubuntu 16.x | Linux | Datacenter1 |
| Beach, Sandy | E3000600 | 4 | Windows Server 2012 | Windows | Datacenter 1 |
| Paulson, Paulina | E1234567 | 8 | Ubuntu 16.x | Linux | Datacenter 1 |
| Paulson, Paulina | E1234567 | 8 | RHEL 7.x / OEL 7.x | Linux | Datacenter 2 |
| Ferguson, Turd | E9876543 | 2 | Ubuntu 14.x | Linux | Datacenter 1 |
| Williams, Bill | E6543125 | 2 | RHEL 7.x / OEL 7.x | Linux | Datacenter 2 |
| Kent, Clark | E9871235 | 4 | RHEL 7.x / OEL 7.x | Linux | Datacenter 2 |
| Pendous, Stu | E8979815 | 6 | RHEL 7.x / OEL 6.x | Linux | Datacenter 2 |
| Peterson, Pete | E6461312 | 4 | RHEL 7.x / OEL 7.x | Linux | Datacenter 3 |
| Wayne, Bruce | E6549876 | 2 | Windows Server 2016 | Windows | Datacenter 1 |
| Parker, Peter | E3246542 | 2 | Ubuntu 16.x | Linux | Datacenter 2 |
| Tomorrow, Maybe | E6798466 | 4 | Windows Server 2012 | Windows | Datacenter 2 |
| Macklin, Burt | E2315674 | 2 | Windows Server 2012 | Windows | Datacenter1 |

FIG. 9

| Log Date | Sender IP | Host Name | Connection Spikes | Destinations | Total Bytes | Anomaly Score |
|---|---|---|---|---|---|---|
| 2019-03-11 | 10.48.244.81 | FidServer1 | 0 | 4 | 374317 | 0.39985976 |
| 2019-03-11 | 10.198.4.249 | FidServer2 | 0 | 1 | 1474 | 0.0049507576 |
| 2019-03-10 | 10.198.4.249 | FidServer2 | 0 | 1 | 1474 | 0.007980684 |
| 2019-03-09 | 10.198.4.249 | FidServer2 | 0 | 1 | 1474 | 0.0063849795 |
| 2019-03-10 | 10.97.31.107 | FidServer3 | 0 | 1 | 3814269 | 0.0003171736 |
| 2019-03-09 | 10.97.31.107 | FidServer3 | 0 | 2 | 1336519498 | 0.43045595 |
| 2019-03-10 | 10.45.7.9 | FidServer4 | 9 | 1 | 3797716979 | 0.4813994 |
| 2019-03-11 | 10.77.243.55 | FidServer5 | 0 | 1 | 1652824891 | 0.37731096 |
| 2019-03-11 | 10.77.243.5 | FidServer6 | 18 | 1 | 6494077907 | 0.5267843 |
| 2019-03-10 | 10.77.243.5 | FidServer6 | 7 | 1 | 1235660006 | 0.47148377 |
| 2019-03-11 | 10.77.243.37 | FidServer7 | 13 | 1 | 9589220557 | 0.5140508 |
| 2019-03-10 | 10.77.243.37 | FidServer7 | 13 | 1 | 8442924410 | 0.50027114 |
| 2019-03-09 | 20.77.243.37 | FidServer7 | 13 | 1 | 5885556900 | 0.5069168 |
| 2019-03-11 | 10.176.43.5 | FidServer8 | 1 | 1 | 3427563693 | 0.43703705 |

SYSTEMS AND METHODS FOR DATA EXFILTRATION DETECTION

FIELD OF THE INVENTION

The present invention relates generally to systems and methods for detecting anomalous data traffic in communication networks, including systems and methods for detecting anomalous data exfiltration in communication networks.

BACKGROUND OF THE INVENTION

Modern computing infrastructures in large organizations are often susceptible to Internet-based attacks. In addition, members of these large organization (e.g., employees) are increasingly using personal devices within the organization's network and/or for business applications. As a result, administrators of the computing infrastructures of large organizations have gradually seen their visibility of data traffic behavior within their organizations reduced. This visibility is often crucial when trying to prevent the unauthorized transfer of data outside of the organization's network.

In response to these challenges, administrators of computing infrastructures of large organizations are deploying security measures that generate logs of data traffic across the data network of these organizations. For example, the data logs can generate information about web traffic, malware infections, policy violations, and authentication mechanisms, among others. However, especially for large organizations, these data logs contain large volumes of data that become increasingly difficult to navigate when trying to detect anomalous or suspicious data traffic.

SUMMARY OF THE INVENTION

Accordingly, an object of the invention is to provide network administrators with systems and methods for analyzing data logs and detecting outliers for traffic occurring over network channels. It is an object of the invention to provide network administrators with systems and methods for detecting anomalous and/or suspicious data traffic over an organization's communication network. It is an object of the invention to provide network administrators with systems and methods for analyzing data logs and detecting outliers for traffic occurring over network channels when the content of the transmission cannot be scanned and/or identified.

It is an object of the invention to detect data loss over network proxy servers by leveraging analytic approaches to rapidly analyze large volumes of network logs and detect anomalous network traffic indicative of attempts to transfer confidential information from an internal network to the internet. It is an object of the invention to extract risk-based features from network log data and leverage machine learning algorithms to detect outliers from the population. For example, outliers can be defined as any connection from an internal network to an external network that does not appear to support an organizational need. It is an object of the invention to normalize and groups normal activity, and detect patterns of abnormal activity.

It is an object of the invention to identify instances where sensitive data is transferred out of a network. Such activity can be done by malicious insiders, malware, or incidental data loss. It is an object of the invention to score all network traffic logs in a selected timeframe to define a pattern of normal business traffic and also establish how far away outliers are from normal activity. It is an object of the invention to allow administrators of computing infrastructures to investigate and follow-up on connections that have the highest score.

In some aspects, a method for detecting anomalous data traffic over proxy servers in a data communications network includes receiving, by a server computing device, network log data corresponding to data traffic during a timeframe. The method further includes normalizing, by the server computing device, the network log data using at least one of timestamp data of the network log data or IP address data of the network log data. The method also includes extracting, by the server computing device, risk-based data features from the network log data. The risk-based features include at least one of destination-based data features, traffic-based data features, host-based data features, or time-based data features. Further, the method includes calculating, by the server computing device, using an isolation forest algorithm, anomaly scores for the normalized network log data based on the extracted risk-based data features. The method also includes determining, by the server computing device, at least one anomaly event based on the calculated anomaly scores. The method further includes identifying, by the server computing device, at least one host device and at least one timestamp corresponding to the at least one anomaly event.

In some embodiments, normalizing the network log data using the timestamp data includes representing the network log data based on a local time corresponding to the network log data.

In other embodiments, normalizing the network log data using the IP address data includes determining host device data based on the IP address data and an IP-to-host mapping, and representing the network log data based on the host device data.

In some embodiments, the destination-based data features includes at least one of new destinations, unique destinations, or unpopular destinations. In other embodiments, the traffic-based features include at least one of connection spikes, connection bursts, domain spikes, domain bursts, a size of total bytes sent, an average duration of a connection, or a total number of connections.

In some embodiments, the host-based data features include at least one of sender-destination pairs or an IP address. In other embodiments, the time-based data features include a number of connections initiated during off hours.

In some embodiments, the anomaly event corresponds to a connection between an internal network and an external network. For example, in some embodiments, the anomaly event corresponds to sensitive data being transferred between the internal network and the external network. In other embodiments, the anomaly event corresponds to activity of at least one of malicious insiders, malware, or incidental data loss.

In some aspects, a system for detecting anomalous data traffic over proxy servers in a data communication network includes host devices communicatively coupled to a server computing device. The server computing device is configured to receive network log data corresponding to data traffic during a timeframe. The server computing device is also configured to normalize the network log data using at least one of timestamp data of the network log data or IP address data of the network log data. Further, the server computing device is configured to extract risk-based data features from the network log data. The risk-based features include at least one of destination-based data features, traffic-based data features, host-based data features, or time-based data features. The server computing device is also configured to calculate, using an isolation forest algorithm, anomaly scores for the normalized network log data based on the extracted risk-based data features. The server computing device is further configured to determine at least one anomaly event based on the calculated anomaly scores. The server computing device is also configured to identify at least one host device and at least one timestamp corresponding to the at least one anomaly event.

In some embodiments, the server computing device is further configured to normalize the network log data using the timestamp data by representing the network log data based on a local time corresponding to the network log data.

In some embodiments, the server computing device is further configured to normalize the network log data using IP address data by determining host device data based on the IP address data and an IP-to-host mapping, and representing the network log data based on the host device data.

In some embodiments, the destination-based data features includes at least one of new destinations, unique destinations, or unpopular destinations. In other embodiments, the traffic-based features include at least one of connection spikes, connection bursts, domain spikes, domain bursts, a size of total bytes sent, an average duration of a connection, or a total number of connections.

In some embodiments, the host-based data features include at least one of sender-destination pairs or an IP address. In other embodiments, the time-based data features include a number of connections initiated during off hours.

In some embodiments, the anomaly event corresponds to a connection between an internal network and an external network. For example, in some embodiments, the anomaly event corresponds to sensitive data being transferred between the internal network and the external network. In other embodiments, the anomaly event corresponds to activity of at least one of malicious insiders, malware, or incidental data loss.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for providing network administrators with systems and methods for analyzing data logs and detecting outliers for traffic occurring over network channels. The system and methods can include mechanisms or methods for detecting anomalous and/or suspicious data traffic over an organization's communication network. The systems and methods described herein can facilitate network administrators by analyzing data logs and detecting outliers for traffic occurring over network channels when the content of the transmission cannot be scanned and/or identified.

The systems and methods described herein can detect data loss over network proxy servers by leveraging analytic approaches to rapidly analyze large volumes of network logs and detect anomalous network traffic indicative of attempts to transfer confidential information from an internal network to the internet. The systems and methods described herein can extract risk-based features from network log data and leverage machine learning algorithms to detect outliers from the population. For example, outliers can be defined as any connection from an internal network to an external network that does not appear to support an organizational need. The systems and methods described herein can normalize and group normal activity, and detect patterns of abnormal activity, all unsupervised.

The systems and methods described herein can identify instances where sensitive data is transferred out of a network. Such activity can be done by malicious insiders, malware, or incidental data loss. The systems and methods described herein can score all network traffic logs in a selected timeframe to define a pattern of normal business traffic and also establish how far away outliers are from normal activity. The systems and methods described herein allows analysts to investigate and follow-up on connections that have the highest score.

Figure 1:
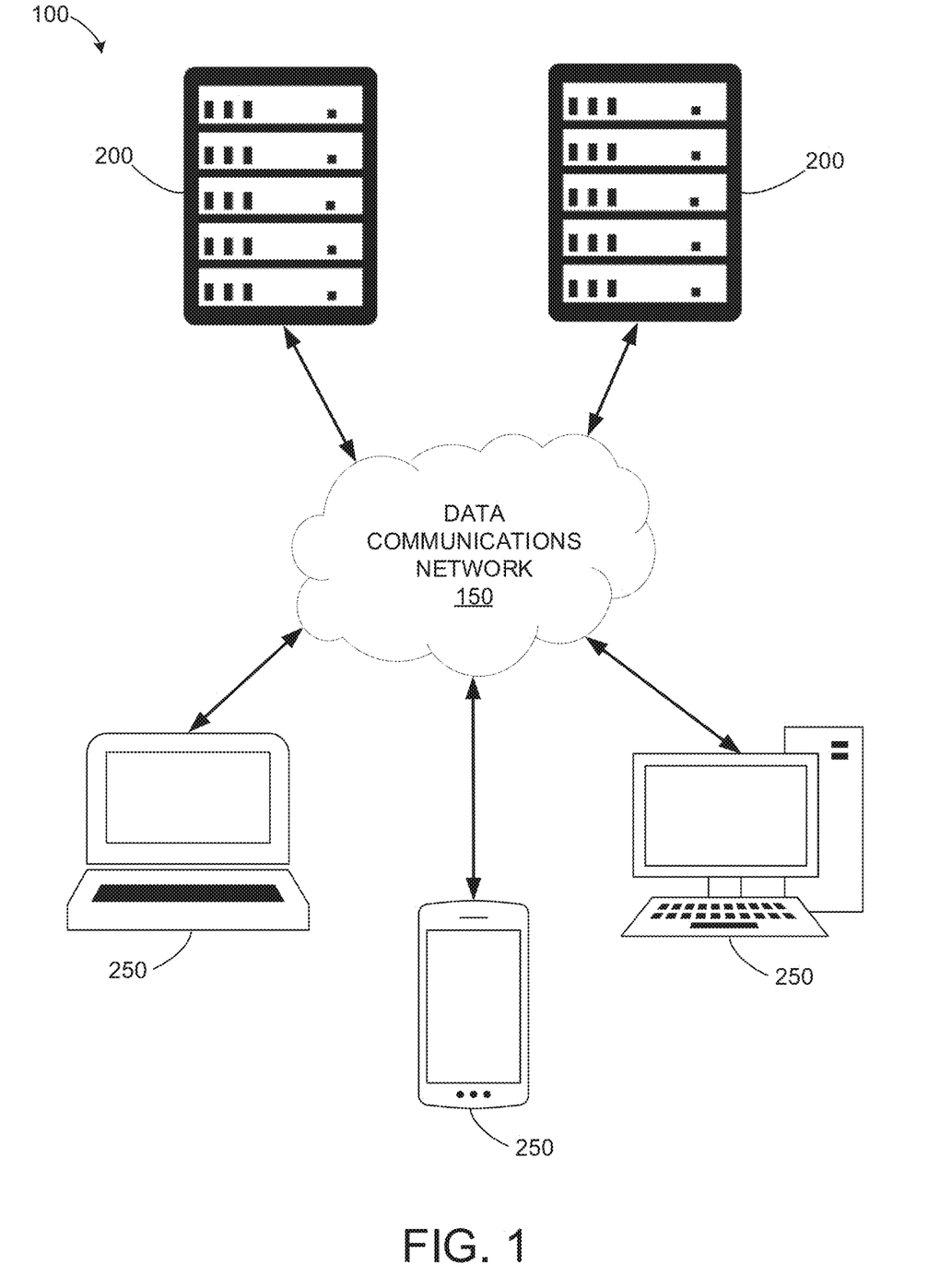
FIG. 1 is a block diagram of an exemplary data communications network according to embodiments of the technology described herein.
Figure 2:
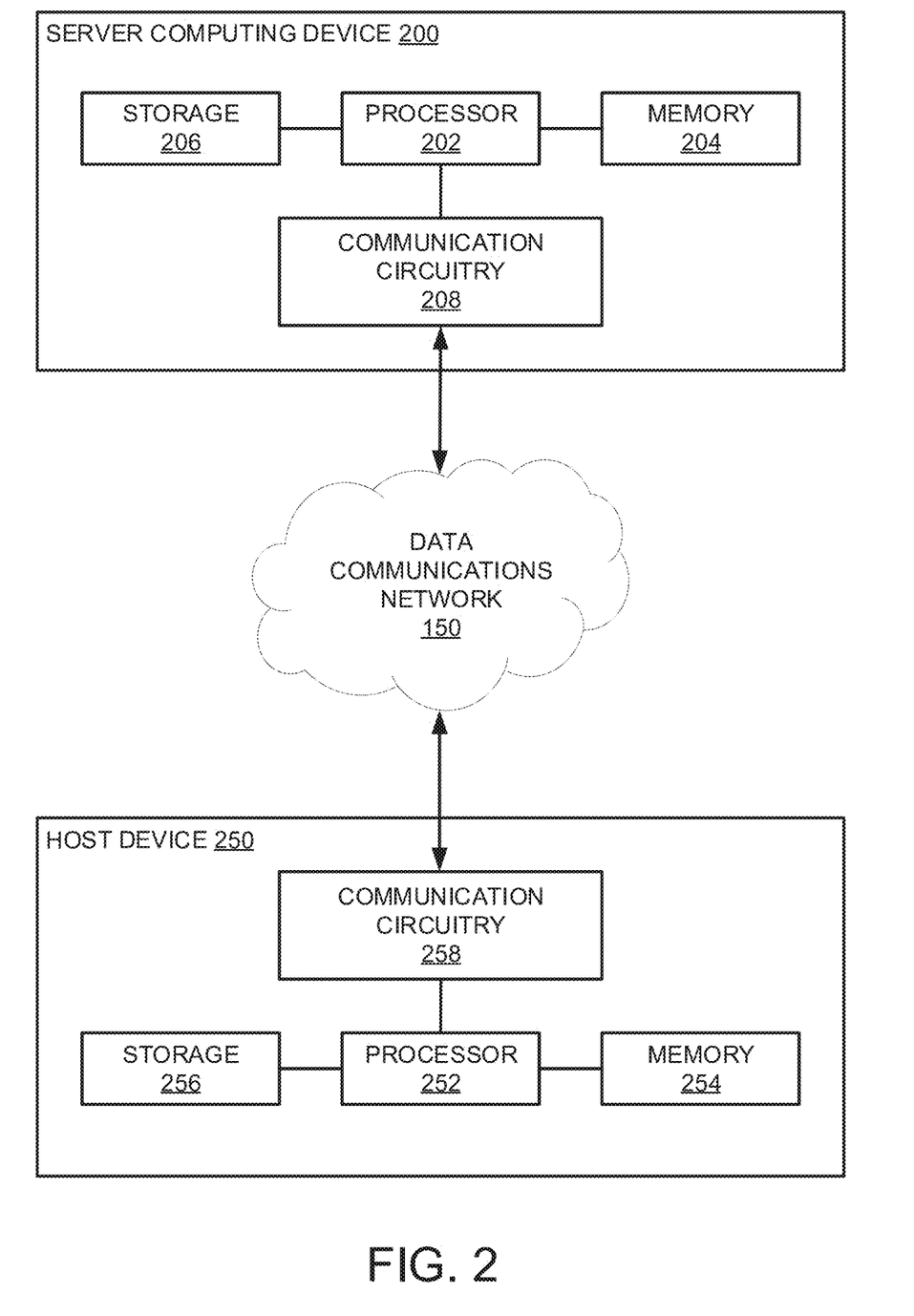
FIG. 2 is a block diagram of an exemplary server computing device and an exemplary host device according to embodiments of the technology described herein.

Referring to FIGS. 1 and 2, an exemplary communications system 100 includes data communications network 150, exemplary server computing devices 200, and exemplary host devices 250. In some embodiments, the system 100 includes one or more server computing devices 200 and one or more host devices 250. Each server computing device 200 can include a processor 202, memory 204, storage 206, and communication circuitry 208. Each host device 250 can include a processor 252, memory 254, storage 256, and communication circuitry 258. In some embodiments, communication circuitry 208 of the server computing devices 200 is communicatively coupled to the communication circuitry 258 of the host devices 250 via data communications network 150. Communication circuitry 208 and communication circuitry 258 can use Bluetooth, Wi-Fi, or any comparable data transfer connection. The host devices 250 can include personal workstations, laptops, tablets, mobile devices, or any other comparable device.

Figure 3:
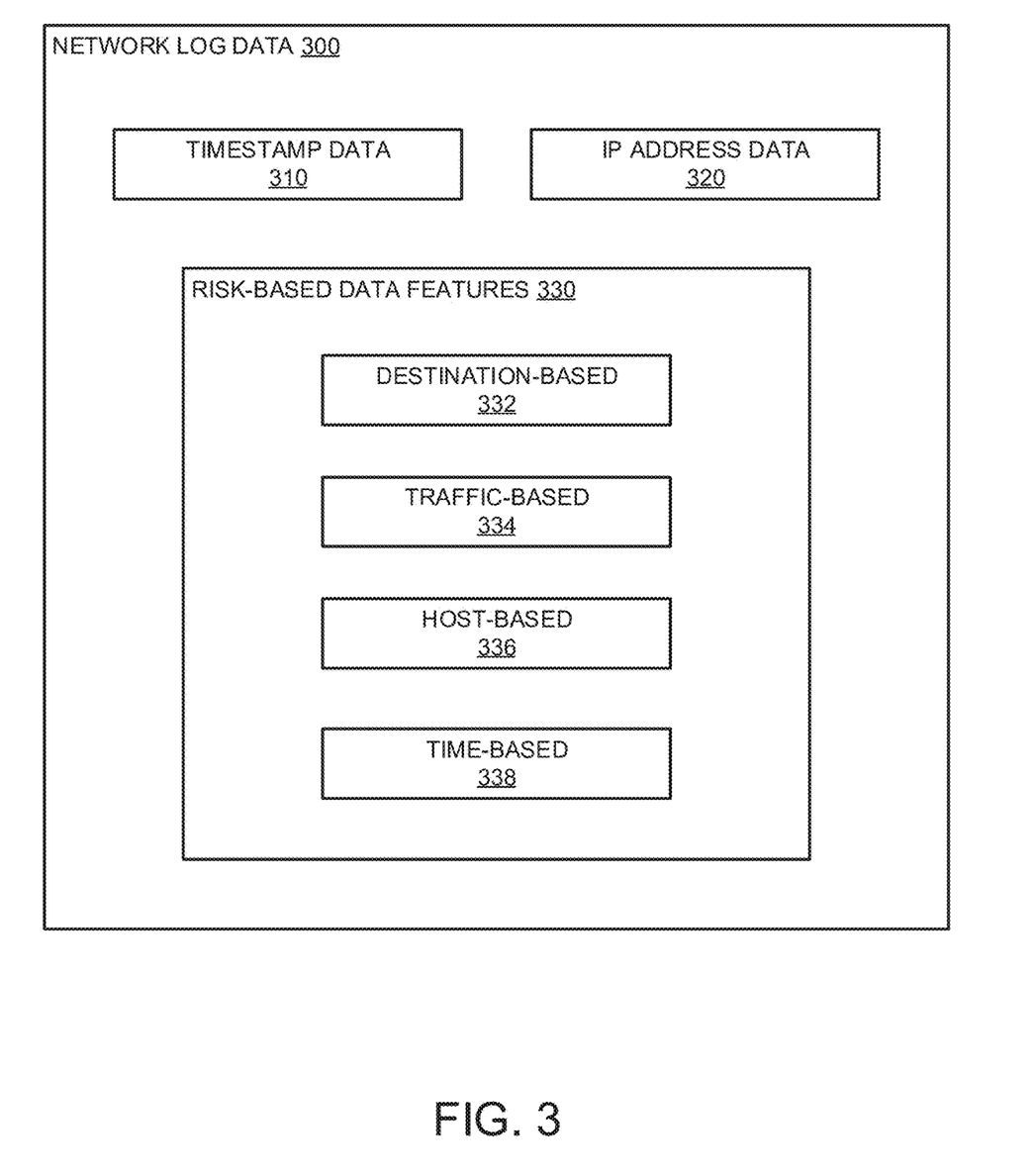
FIG. 3 is a diagram showing a visualization of exemplary network log data according to embodiments of the technology described herein.

Referring to FIG. 3, a visualization of exemplary network log data 300 is illustrated. In some embodiments, network log data 300 includes timestamp data 310, IP address data 320, and risk-based features 330. In some embodiments, the risk-based data features 330 includes destination-based features 332, traffic-based features 334, host-based features 336, and time-based features 338. The server computing device 200 extracts the risk-based features 330 from the network log data 300.

The risk-based features 330 are extracted with a focus on detecting anomalous connections based on certain behaviors that could indicate actions indicative of a user or software attempting to move sensitive data from within the data communications network 150 to an external network. The risk-based features 330 are determined based on the metadata collected in the network log data 300. In some instances, data traffic that is for legitimate organizational purposes do not meet any one specific criterion, and neither does traffic where data exfiltration is attempted. As a result, the system 100 extracts a number of risk-based features 330 to assess the connection as a whole and compare against other connections for the given time period. For example, data exfiltration could take the form of 1 connection where a large file of sensitive information is sent or several connections where a number of smaller files are sent. In some embodiments, each risk-based feature 330 is based on the activity of one host device 250 per day.

Destination-based features 332 focus on where data is being sent to. When considering data exfiltration, understanding where the data is being sent is critical for establishing a risk profile of a given connection. Certain connections to trusted destinations can be ignored and connections to untrusted or unknown destinations should be assessed and potentially investigated. Examples of destination-based features 332 include the number of destinations that a host device 250 connects to that have not showed up in previous network log data 300 and the unique count of destinations that a host device 250 connected to. Other examples of destination-based features 332 include the number of least popular destinations that the host device 250 connects to and the number of destinations that resolve as IP addresses only.

Traffic-based features 334 focus on the number of connections made by a host device 250. An example traffic-based feature 334 includes the number of connection spikes. In some embodiments, the number of connection spikes is determined when the same host device 250 initiates ten connections within one minute. Other examples of traffic-based features 334 include the number of connection bursts, the number of domain spikes, and the number of domain bursts. In some embodiments, the number of connection bursts is determined when the same host device 250 performs two or more subsequent connection spikes. In other embodiments, the number of domain spikes is determined when the same host device 250 performs two or more connections to the same domain in one hour. In some embodiments, the number of domain bursts is determined when the same host device 250 performs two or more subsequent domain spikes. Other examples of traffic-based features 334 include the total number of bytes sent by a host device 250 in a day, the average duration of a host device 250's connections, and the number of total connections established by a host device 250 within a day.

Examples of host-based features 336 include the number of new sender-destination pairs and sender IP addresses. In some embodiments, new sender-destination pairs establish a baseline of normal activity and ignores connections that have been made in the past. In some embodiments, the sender IP address corresponds to a static IP address that has been added to a white-list. In other embodiments, the sender IP address corresponds to a user ID that is used to connect to a host device 250. An example of a time-based feature 338 includes the number of connections initiated outside of a default time window. For example, a time-based feature 338 can include the number of connections initiated outside of business hours or on weekends.

Figure 4:
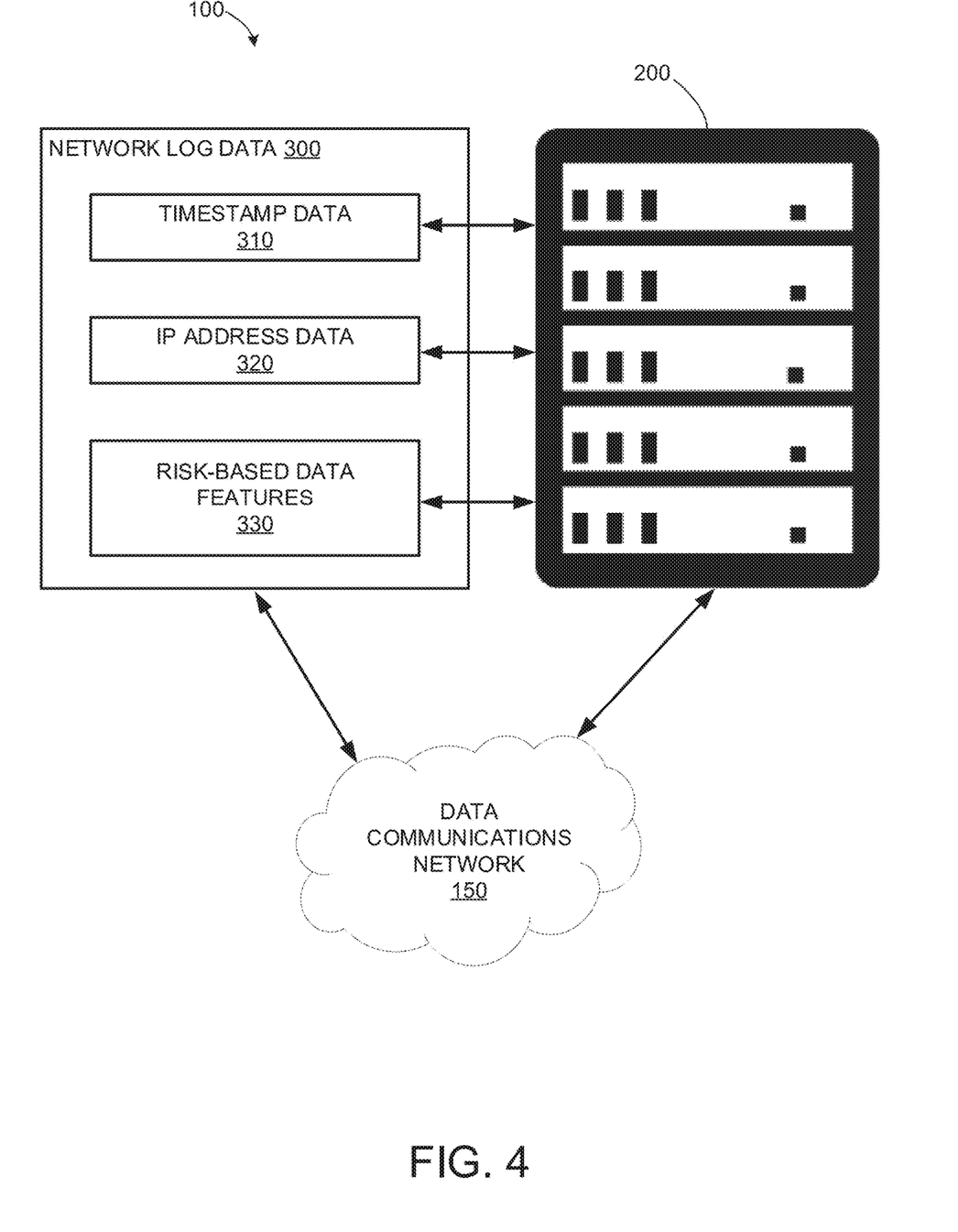
FIG. 4 is a diagram showing a visualization of an exemplary sequence for detecting anomalous data traffic over proxy servers in the data communications network shown in FIG. 1, according to embodiments of the technology described herein.
Figure 5:
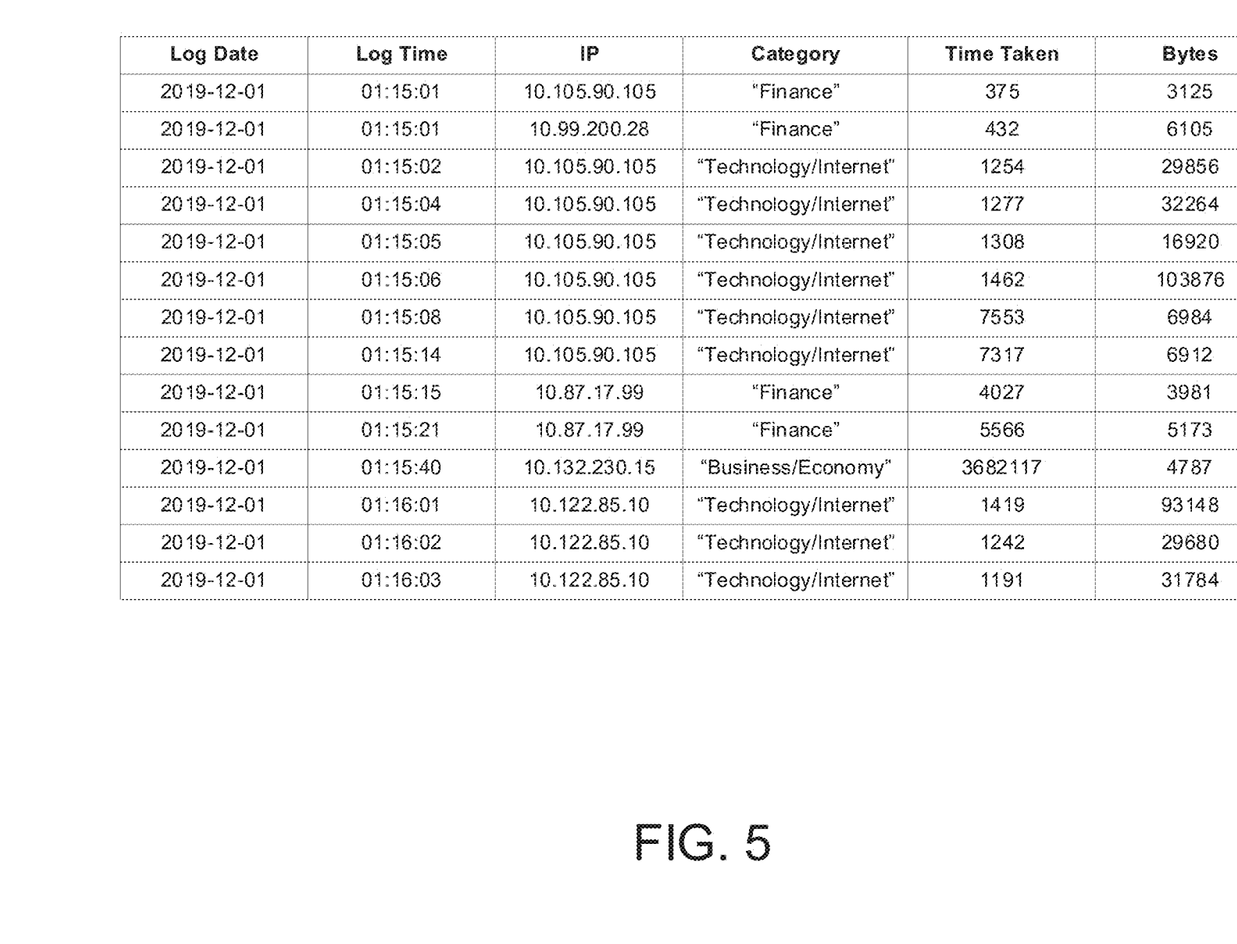
FIG. 5 is a diagram showing a visualization of exemplary network log data during a timeframe, according to embodiments of the technology described herein.

Referring to FIG. 4, a visualization of an exemplary sequence for detecting anomalous data traffic over server computing devices 200 in a data communications network 150 is illustrated. The server computing device 200 is configured to receive network log data 300 corresponding to data traffic during a timeframe and normalize the network log data using at least one of timestamp data 310 or IP address data 320. FIG. 5 is a visualization of exemplary network log data 300 during a timeframe. As shown, the example network log data 300 includes example timestamp data 310 and example IP address data 320. Additionally, the example network log data 300 shown in FIG. 5 includes example categories and size of the data traffic.

Figure 6:
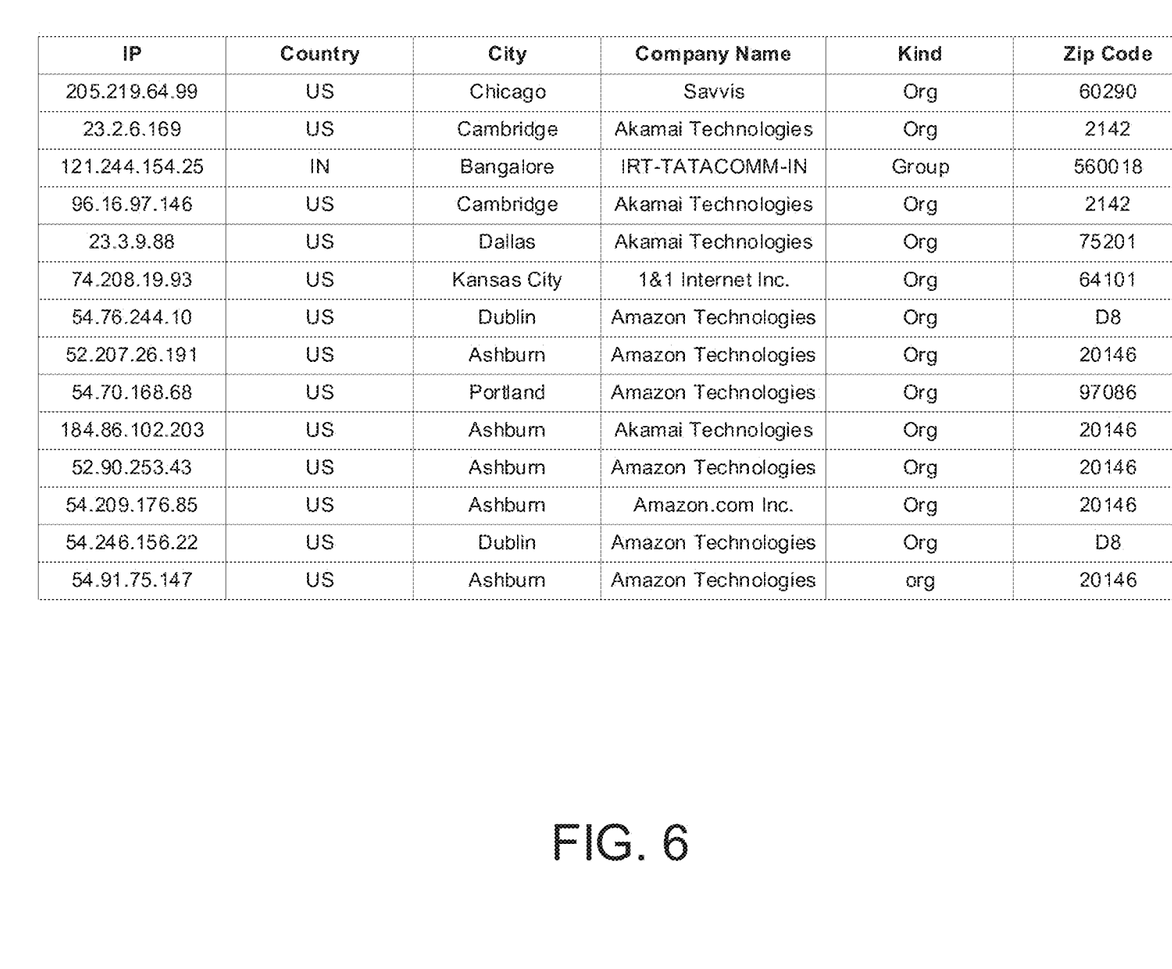
FIG. 6 is a diagram showing a visualization of exemplary network data sets including IP address and location data, according to embodiments of the technology described herein.

In addition to the exemplary network log data 300 shown in FIG. 5, additional data sets can be used to enhance the network log data 300. For example, FIGS. 6-9 illustrate visualizations of exemplary network data sets that can be used by the server computing device 200 to enhance the network log data 300. FIG. 6 illustrates an exemplary data set, including IP address and location data, that can be used to enhance destination-based features 332 by running IP addresses against public sources to get location and company data.

Figure 7:
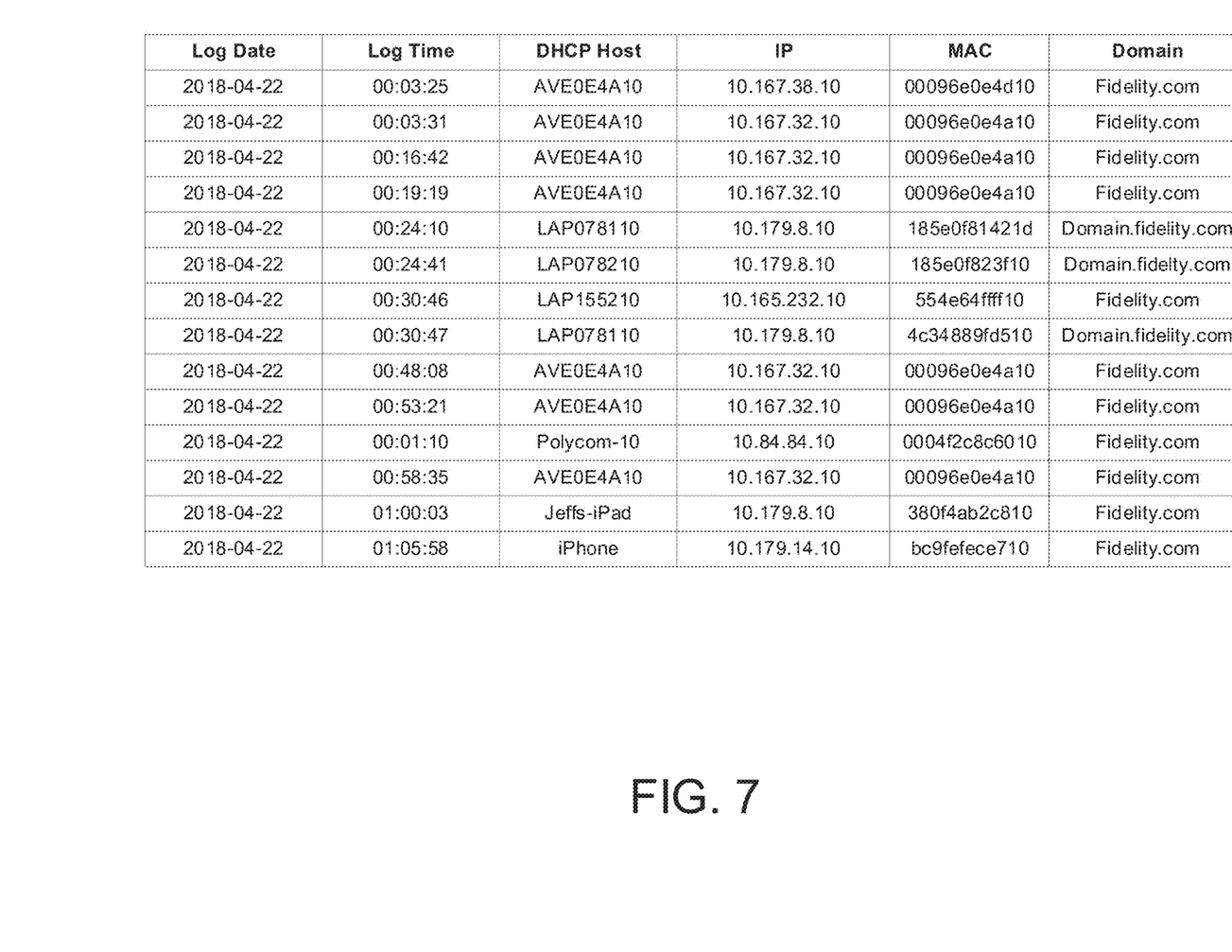
FIG. 7 is a diagram showing a visualization of exemplary network data sets including DHCP network and domain data, according to embodiments of the technology described herein.
Figure 8:
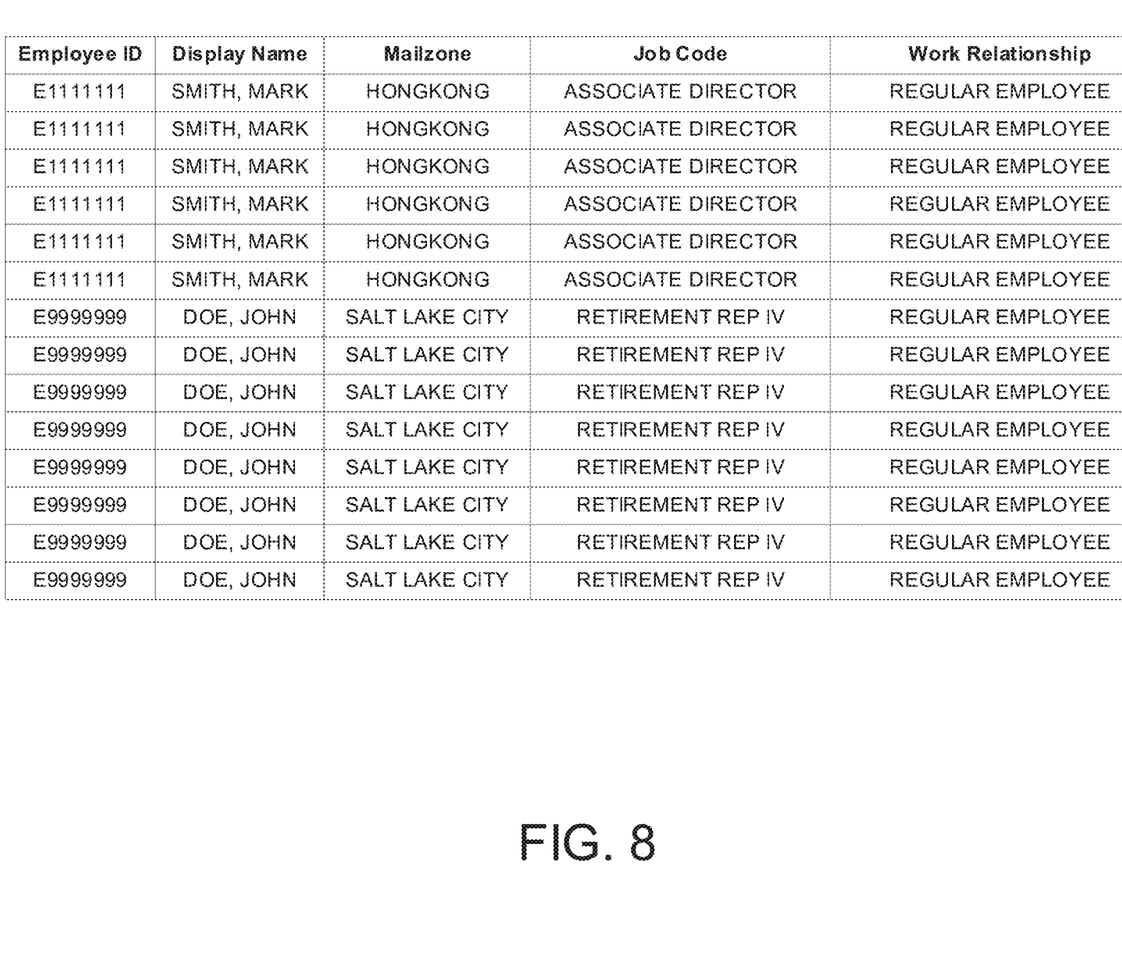
FIG. 8 is a diagram showing a visualization of exemplary network data sets including employee data, according to embodiments of the technology described herein.
Figure 9:
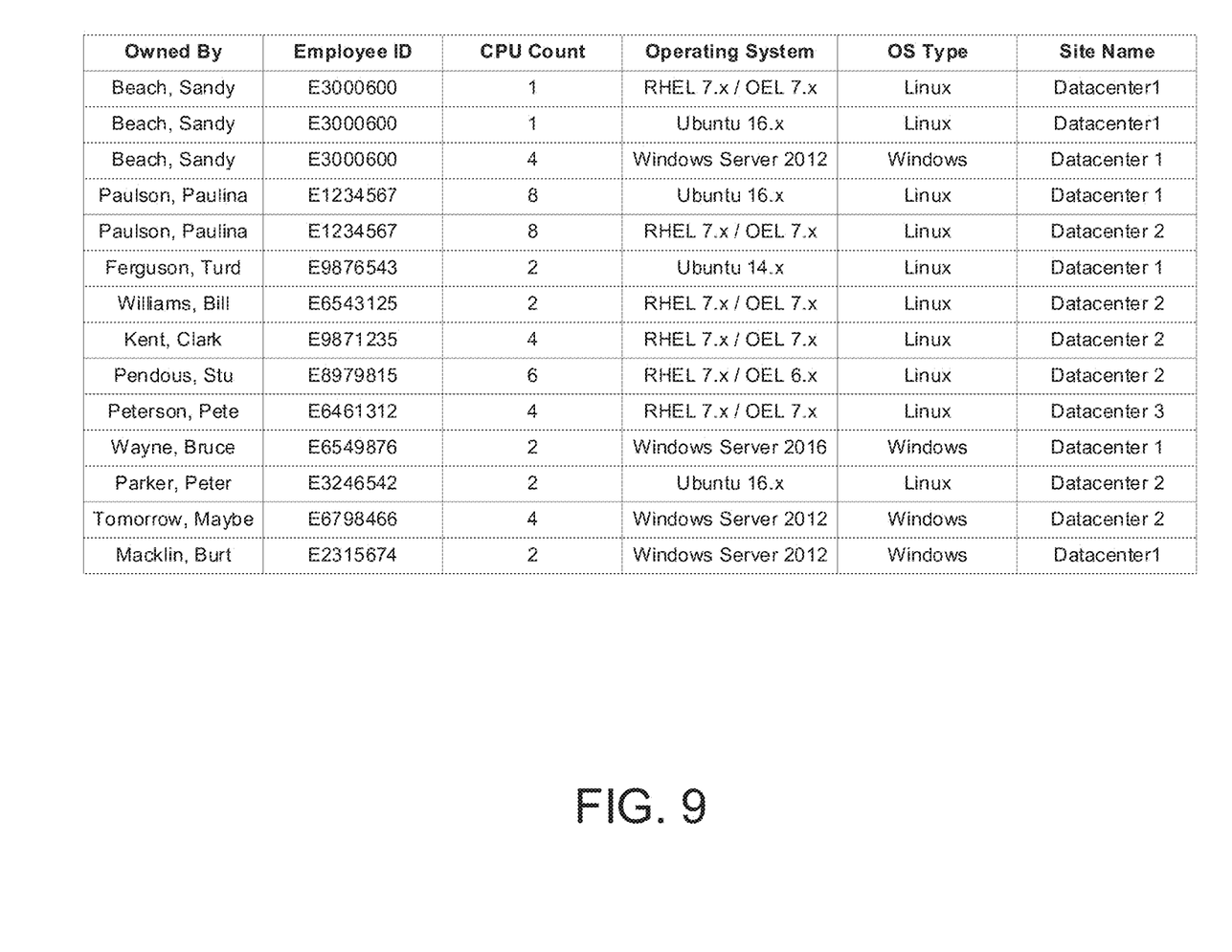
FIG. 9 is a diagram showing a visualization of exemplary network data sets including server data, according to embodiments of the technology described herein.

FIG. 7 illustrates an exemplary data set, including DHCP network and domain data, that can be used to enhance traffic-based features 334, host-based features 336, and time-based features 338. Because some organizations use dynamic IP addresses, end user devices (e.g., laptops and desktops) frequently change their IP address when they connect to the network. The data set illustrated in FIG. 7 would allow hostnames and MAC addresses to be resolved. FIG. 8 illustrates an exemplary data set, including employee data, that can be used to enhance traffic-based features 334, host-based features 336, and time-based features 338. By looking up the user ID, the server computing device 200 can resolve employment data such as job title, location, and whether the user is a full time or contracted employee. FIG. 9 illustrates an exemplary data set, including server data, that can be used to enhance traffic-based features 334 and host-based features 336 by tracking the server back to an owner and/or individual.

Figure 10:
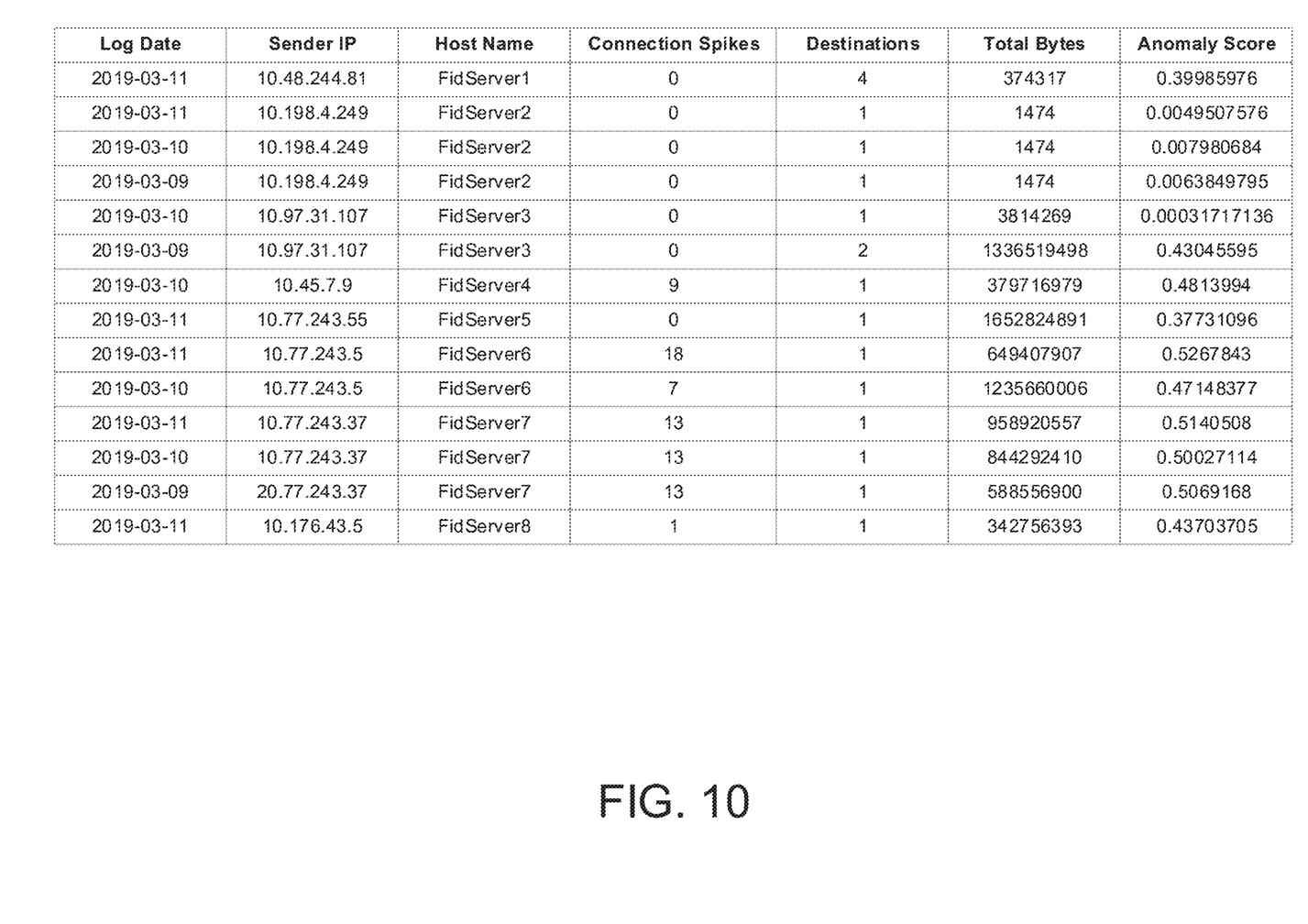
FIG. 10 is a diagram showing a visualization of exemplary output data corresponding to detected anomalous data traffic, according to embodiments of the technology described herein.

The server computing device 200 is also configured to extract risk-based data features 330 from the network log data 300 and calculate anomaly scores for the normalized network log data 300 based on the extracted risk-based data features. The server computing device 200 is configured to calculate the anomaly scores using an isolation forest algorithm. The server computing device 200 is also configured to determine at least one anomaly event based on the calculated anomaly scores and identify at least one host device 250 and at least one timestamp corresponding to the at least one anomaly event. For example, FIG. 10 is a visualization of exemplary output data corresponding to detected anomalous data traffic. As shown, the example output data includes calculated anomaly scores, host names, sender IP addresses, and timestamps, among other features. In some embodiments, each anomaly event is scored from 0 to 1. In other embodiments, each anomaly event is scored from −1 to 1.

The isolation forest algorithm explicitly isolates anomalies rather than profiles normal instances by taking advantage of quantitative properties of anomalies. For example, anomalies consists of the minority of events and they have attribute values that are very different from those of normal instances. These properties makes anomalies more susceptible to isolation than normal events. In some embodiments, the isolation forest algorithm can be described as follows.

Given a sample of data X={x1, . . . , xn} of n instances, an isolation tree (iTree) recursively divides X by randomly selecting an attribute 1 and a split value p, until either: (i) the iTree reaches a height limit, (ii) |X|=1, or (iii) all data in X have the same values. For any internal node T, test q<p divides data points into Tl and Tr.

Assuming all instances are distinct, each instance is isolated to an external node (i.e., a node without a child node) when an iTree is fully grown, in which case the number of external nodes is n and the number of internal nodes is n−1; the total number of nodes of an iTree is 2n−1; and thus the memory requirement is bounded and only grows linearly with n (i.e., O(n)).

The worst case time complexity of iTree is $O(n^2)$ since at each node the algorithm compares up to n values against the split value p and there are n−1 internal nodes. However, because of the subsampling and also data partitioning, the number of samples reaching each node is less than n and thus $O(n^2)$ is the worst case analysis.

The anomaly score can be determined from path length h(x). Path length h(x) of a point x is measured by the number of edges x traverses an iTree from the root node until the traversal is terminated at an external node. The difficulty in deriving an anomaly score from h(x) is that while the maximum possible height of iTree grows on the order of n, the average height grows on the order of log(n). Because iTrees have an equivalent structure to a Binary Search Tree, the algorithm can borrow the analysis from Binary Search Tree to estimate the average path length of iTree. Given a data set of n instances, the average path length can be calculated from:

$$c(n) = 2H(n-1) - \left(\frac{2(n-1)}{n}\right),$$

where H(i) is the harmonic number and it can be estimated by ln(i)+0.5772156649 (Euler's constant). Because c(n) is the average of h(x) given n, the algorithm can use it to normalize h(x). The anomaly score s of an instance x is defined as:

$$s(x, n) = 2^{-\frac{E(h(x))}{c(n)}},$$

where E(h(x)) is the average h(x) from a collection of iTrees, and s is monotonic to h(x). When E(h(x)) approaches c(n), s approaches 0.5. E(h(x)) approaches n−1, s approaches 0. An anomaly corresponds to when E(h(x)) approaches 0, and s approaches 1.

The isolation forest algorithm is an ensemble of iTrees, in which each tree is trained using a subsample of the original dataset. Subsampling size Ψ can be a constant or a fraction of the size of the dataset. In some embodiments, the subsampling size Ψ=256. Another parameter for the isolation forest algorithm is the number of iTrees that controls the ensemble size. In some embodiments, the number of iTrees is about t=100. The complexity of the training of the isolation forest algorithm is O(t Ψ log Ψ). Because of their susceptibility to isolation, anomalies are isolated closer to the root of the tree, whereas normal points are isolated at the deeper end of the tree.

Figure 11:
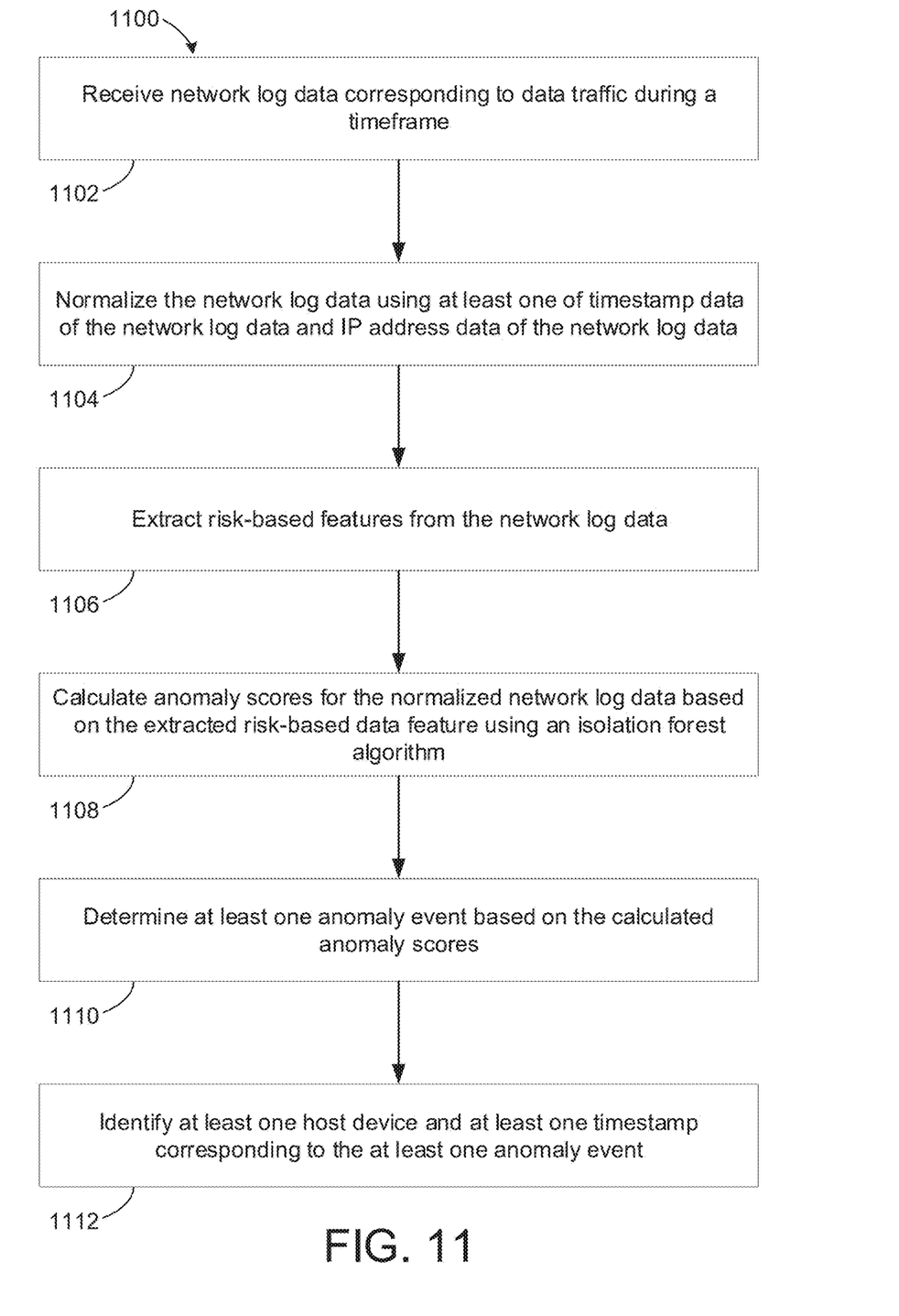
FIG. 11 is a flow diagram of a computer-implemented method for detecting anomalous data traffic over proxy servers in the data communications network shown in FIG. 1, according to embodiments of the technology described herein.

Referring to FIG. 11, a process 1100 for detecting anomalous data traffic over proxy servers in a data communications network 150 is illustrated. The process 1100 begins by receiving, by a server computing device 200, network log data 300 corresponding to data traffic during a timeframe in step 1102.

Process 1100 continues by normalizing, by the server computing device 200, the network log data 300 using at least one of timestamp data 310 of the network log data 300 and IP address data 320 of the network log data 300 in step 1104. For example, in some embodiments, the server computing device 200 can be configured to normalize the network log data 300 using the timestamp data 310 by representing the network log data 300 based on a local time corresponding to the network log data 300. In other embodiments, the server computing device 200 can be configured to normalize the network log data 300 using the IP address data 320 by determining host device data based on the IP address data 320 and an IP-to-host mapping, and representing the network log data 300 based on the host device data.

Process 1100 continues by extracting, by the server computing device 200, risk-based data features 330 from the network log data 300 in step 1106. The risk-based data features 330 include at least one of destination-based data features 332, traffic-based data features 334, host-based data features 336, or time-based data features 338. For example, in some embodiments, the destination-based data features 332 include at least one of new destinations, unique destinations, or unpopular destination.

In some embodiments, the traffic-based data features 334 include at least one of connection spikes, connection bursts, domain spikes, domain bursts, a size of total bytes sent, an average duration of a connection, or a total number of connections. In other embodiments, the host-based data features 336 include at least one of sender-destination pairs or an IP address. In some embodiments, the time-based data features include a number of connections initiated during off hours.

Process 1100 continues by calculating, by the server computing device 200, using an isolation forest algorithm, anomaly scores for the normalized network log data 300 based on the extracted risk-based data features 330 in step 1108. As discussed above in relation to FIG. 4, the server computing device 200 can calculate anomaly scores using an isolation forest algorithm that isolates anomalies with iTrees. In some embodiments, the server computing device 200 can include an additional module that calculates the importance of each of the extracted risk-based data features 330 and weighs each of the extracted risk-based data features 330 by their importance before calculating anomaly scores.

Process 1100 continues by determining, by the server computing device 200, at least one anomaly event based on the calculated anomaly scores in step 1110. In some embodiments, the anomaly event corresponds to a connection between an internal network and an external network. For example. in some embodiments, the anomaly event can correspond to sensitive data being transferred between the internal network and the external network. In other embodiments, the anomaly event can correspond to activity of at least one of malicious insiders, malware, or incidental data loss.

Process 1100 finishes by identifying, by the server computing device 200, at least one host device 250 and at least one timestamp corresponding to the at least one anomaly event in step 1112. Once at least one host device 250 and at least one timestamp corresponding to the anomaly event is identified, administrators of the communications system 100 are enabled to investigate and follow-up on the one or more anomaly events. For example, once at least one host device 250 and at least one timestamp corresponding to the anomaly event is identified, administrators of the communications system 100 can manually review the anomaly event and determine whether additional actions need to be taken to safeguard sensitive data. In some embodiments, if trends in anomalous behavior are detected, a rules engine can be developed using the identified host devices and timestamps. The rules engine can be used to build automated thresholds to restrict or require further approval for certain activity.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A method for detecting anomalous data traffic over proxy servers in a data communications network, the method comprising:
   receiving, by a server computing device, network log data corresponding to data traffic during a timeframe;
   normalizing, by the server computing device, the network log data using at least one of timestamp data of the network log data or IP address data of the network log data;
   extracting, by the server computing device, risk-based data features from the network log data, wherein the risk-based data features comprise destination-based data features and at least one of traffic-based data features, host-based data features, or time-based data features,
   wherein the destination-based data features comprise at least one of new destinations, unique destinations, or unpopular destinations;
   calculating, by the server computing device, a weight for each of the extracted risk-based features;
   weighing, by the server computing device, each of the extracted risk-based features;
   calculating, by the server computing device, using an isolation forest algorithm, anomaly scores for the normalized network log data based on the weighed risk-based data features;
   determining, by the server computing device, at least one anomaly event based on the calculated anomaly scores; and
   identifying, by the server computing device, at least one host device and at least one timestamp corresponding to the at least one anomaly event.

2. The method of claim 1, wherein normalizing the network log data using the timestamp data comprises representing the network log data based on a local time corresponding to the network log data.

3. The method of claim 1, wherein normalizing the network log data using the IP address data comprises:
   determining host device data based on the IP address data and an IP-to-host mapping; and
   representing the network log data based on the host device data.

4. The method of claim 1, wherein the traffic-based data features comprise at least one of connection spikes, connection bursts, domain spikes, domain bursts, a size of total bytes sent, an average duration of a connection, or a total number of connections.

5. The method of claim 1, wherein the host-based data features comprise at least one of a plurality of sender-destination pairs or an IP address.

6. The method of claim 1, wherein the time-based data features comprise a number of connections initiated during off hours.

7. The method of claim 1, wherein the anomaly event corresponds to a connection between an internal network and an external network.

8. The method of claim 7, wherein the anomaly event corresponds to sensitive data being transferred between the internal network and the external network.

9. The method of claim 8, wherein the anomaly event corresponds to activity of at least one of malicious insiders, malware, or incidental data loss.

10. A system for detecting anomalous data traffic over proxy servers in a data communication network, the system comprising:
    a plurality of host devices communicatively coupled to a server computing device;
    the server computing device configured to:
      receive network log data corresponding to data traffic during a timeframe;
      normalize the network log data using at least one of timestamp data of the network log data or IP address data of the network log data;
      extract risk-based data features from the network log data, wherein the risk-based data features comprise destination-based features and at least one of traffic-based data features, host-based data features, or time-based data features,
      wherein the destination-based data features comprise at least one of new destinations, unique destinations, or unpopular destinations;

calculate a weight for each of the extracted risk-based features;
weigh each of the extracted risk-based features;
calculate, using an isolation forest algorithm, anomaly scores for the normalized network log data based on the weighed risk-based data features;
determine at least one anomaly event based on the calculated anomaly scores; and
identify at least one host device of the plurality of host devices and at least one timestamp corresponding to the at least one anomaly event.

11. The system of claim 10, wherein the server computing device is configured to normalize the network log data using the timestamp data by representing the network log data based on a local time corresponding to the network log data.

12. The system of claim 10, wherein the server computing device is configured to normalize the network log data using IP address data by:
determining host device data based on the IP address data and an IP-to-host mapping; and
representing the network log data based on the host device data.

13. The system of claim 10, wherein the traffic-based data features comprise at least one of connection spikes, connection bursts, domain spikes, domain bursts, a size of total bytes sent, an average duration of a connection, or a total number of connections.

14. The system of claim 10, wherein the host-based data features comprise at least one of a plurality of sender-destination pairs or an IP address.

15. The system of claim 10, wherein the time-based data features comprise a number of connections initiated during off hours.

16. The system of claim 10, wherein the anomaly event corresponds to a connection between an internal network and an external network.

17. The system of claim 16, wherein the anomaly event corresponds to sensitive data being transferred between the internal network and the external network.

18. The system of claim 17, wherein the anomaly event corresponds to activity of at least one of malicious insiders, malware, or incidental data loss.

* * * * *